US008026446B2

(12) United States Patent
Oriet et al.

(10) Patent No.: US 8,026,446 B2
(45) Date of Patent: Sep. 27, 2011

(54) CABLE ASSEMBLY FOR MULTIPLE BATTERIES

(75) Inventors: Leo P. Oriet, Rochester Hills, MI (US); Jules Cazabon, Staples (CA)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 173 days.

(21) Appl. No.: 12/509,060

(22) Filed: Jul. 24, 2009

(65) Prior Publication Data
US 2011/0018476 A1    Jan. 27, 2011

(51) Int. Cl.
*H01B 7/00* (2006.01)
(52) U.S. Cl. .................................................... 174/113 R
(58) Field of Classification Search ............... 174/70 R, 174/71 R, 113 R
See application file for complete search history.

(56) References Cited

U.S. PATENT DOCUMENTS

| | | | |
|---|---|---|---|
| 3,733,578 A | 5/1973 | Fouche | |
| 5,934,947 A | 8/1999 | Liang | |
| 6,074,243 A | 6/2000 | Edwards | |
| 6,875,924 B2 * | 4/2005 | Porter et al. | 174/69 |
| 2004/0020681 A1 * | 2/2004 | Hjortstam et al. | 174/102 SC |
| 2004/0206540 A1 * | 10/2004 | Frederick et al. | 174/71 R |
| 2007/0267212 A1 * | 11/2007 | Nachbauer et al. | 174/70 R |

OTHER PUBLICATIONS

Photocopy of a page from Today's Technician Shop Manual for Medium/Heavy Duty Truck Electricity and Electronics, Mar. 17, 2009.

* cited by examiner

*Primary Examiner* — Chau Nguyen
(74) *Attorney, Agent, or Firm* — Jeffrey P. Calfa; Mark C. Bach; Gerald W. Askew

(57) ABSTRACT

A vehicle battery cable has a plurality of subsidiary or daughter cables where the subsidiary cables have the same length and gauge and exhibit closely matched resistance. The vehicle battery cable connects a plurality of batteries in parallel to a load in a way that each battery carries the same proportion of the load as every other battery.

6 Claims, 3 Drawing Sheets

CABLE ASSEMBLY FOR MULTIPLE BATTERIES

BACKGROUND

1. Technical Field

The technical field relates to cable assemblies for connecting a plurality of batteries to a load.

2. Background Description

Most batteries installed on internal combustion engine equipped motor vehicles are designed for 12 volt direct current (DC) starter and electrical systems. Heavy duty trucks typically have three or four 12 volt batteries, connected in parallel, to support the cold cranking amperage draw of the starter motor for the vehicle's diesel engine starter. Some heavy duty trucks which use a 24 volt starter system mixed with a 12 volt electrical system in which parallel and series connections are mixed for a set of 12 volt batteries.

Batteries are conventionally connected in parallel by linking like polarity terminals of the battery set using jumper cables. Typically one battery is connected to the next in succession. Battery cables connect the positive and negative terminals of one of the batteries to the load.

A conventional motor vehicle battery for an internal combustion engine equipped vehicle is subjected to its highest loads and highest discharge rate when the vehicle's engine is cranked by a electric starter motor. Rapid discharge of a battery is the likeliest source of internal overheating of a battery, and premature failure of the battery. Experience has shown that in an assembly of parallel connected batteries, the battery having its terminals connected by the battery cables directly to the load is the most likely to fail prematurely, possibly on account of internal overheating. Overheating can stem from a battery carrying a greater part of the starting load, especially during cold cranking of the engine and/or due to more rapid recharging of the battery following starting. Overheating depletes battery cell chemistry and promotes the accumulation of sludge at the bottom of the battery cell closest to the main terminal, potentially shorting out cells within the battery. Excessively quick recharging can reduce water levels in a battery from electrolytic reduction of water into hydrogen and oxygen.

In addition, the jumper cables used to connect the batteries to one another are prone to heat damage adjacent the cable's terminating connectors.

Premature battery failure has been addressed by periodically rearranging the order of the batteries in the connection sequence and changing which battery of the group is the one connected by battery cables to the load without an intervening jumper cable. This action periodically changes which battery is subjected to the stresses imposed by being the battery directly connected to the vehicle electrical system and thus supporting the heaviest loads and seeing the fastest recharging cycles.

Pre-made cable assemblies are known where a butt splice is introduced to the starter cable and an individual cable assembly for each battery provided. The cable assemblies are cut to different discrete lengths to reach a particular battery location. This approach eliminates the use of jumper cables between batteries, however the resistance in the paths from individual batteries still differs from battery to battery stemming from the different lengths of the subsidiary cable assemblies.

SUMMARY

An electrical cable comprises an intermediate section having a main conductor sheathed in an insulation layer. One end of the cable divides into four subsidiary or daughter conductors, the subsidiary conductors being sheathed in insulation, electrically connected to the main conductor at one end, and having the same length as one another. The subsidiary conductors are also of the same gauge as one another to exhibit closely matched resistance characteristics to one another. Use of two of the vehicle battery cables provides a parallel connection of a plurality of batteries to a load so that each battery carries the same proportion of the load as the other batteries and the conductive path between each battery and the charging system is closely matched in resistance.

DETAILED DESCRIPTION

Figure 1:
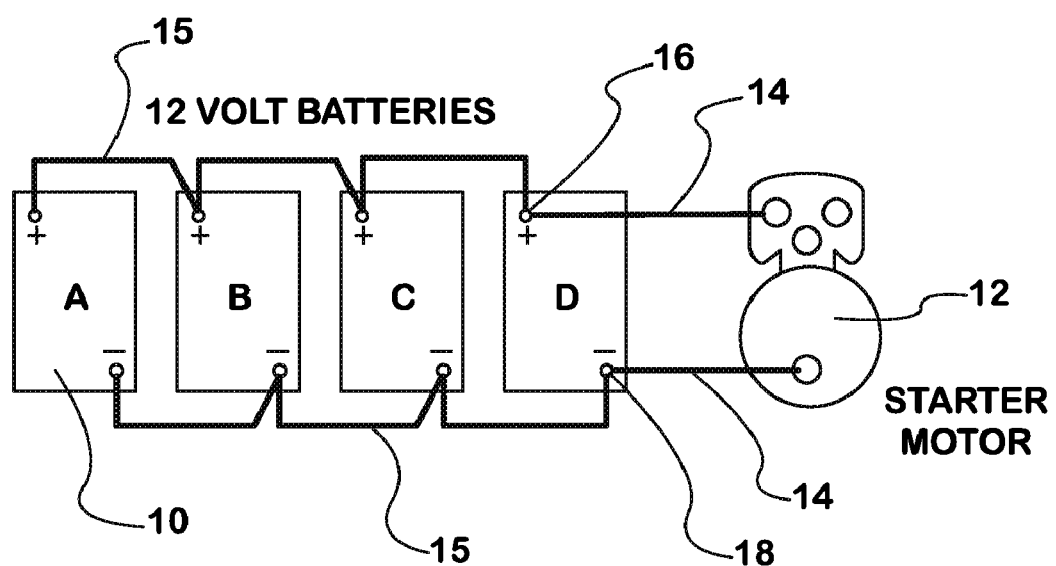
FIG. 1 is a schematic illustration of the parallel connection of a plurality of batteries for a heavy duty motor vehicle using jumper and battery cables.

In the following detailed description, like reference numerals and characters may be used to designate identical, corresponding, or similar components in differing drawing figures. Furthermore, example sizes/values/ranges may be given without intent that these examples be limiting.

An example of a conventional parallel connection of four 12 volt batteries 10 to supply power to a starter motor system 12 for a motor vehicle is illustrated in FIG. 1. A plurality of bridge/jumper cables 15 connect the positive terminals of batteries A through D. Similarly the negative terminals of batteries 10 are connected successively by jumper cables 15. Battery cables 14 connect one of the positive terminals and one of the negative terminals of one battery to the vehicle load, here exemplified by the starter motor system 12.

Figure 2:
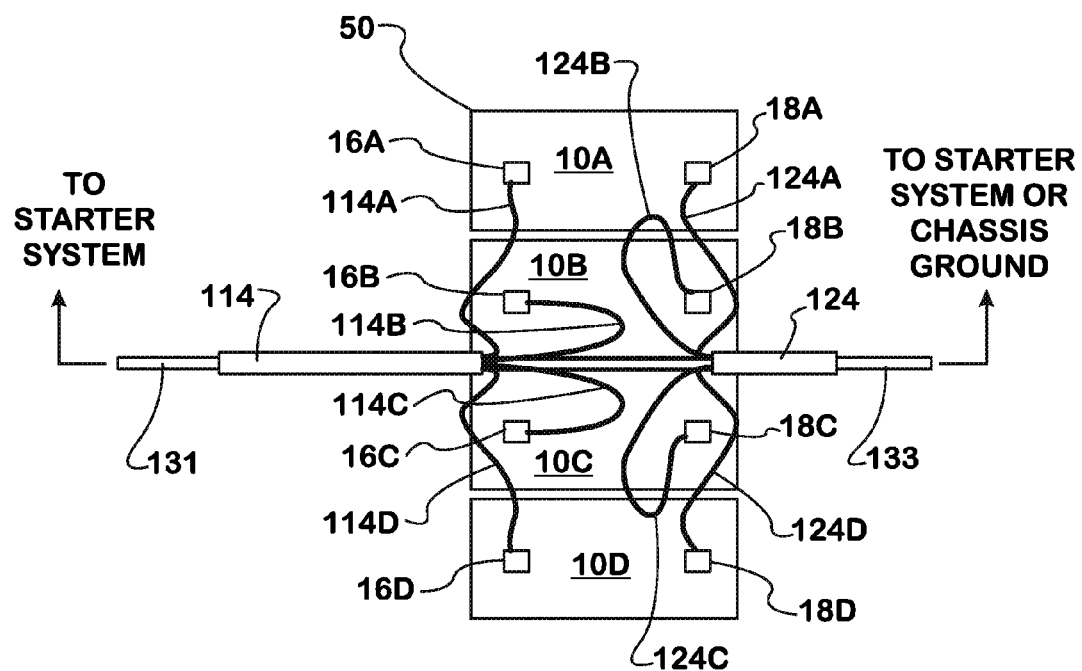
FIG. 2 is a schematic illustration of a parallel connection of a plurality of batteries for a heavy duty motor vehicle using battery cables with equal length daughter cable assemblies.

Referring to FIG. 2, a battery plant 50 of four batteries 10A, 10B, 10C and 10D is illustrated with an electrical connection to a vehicle starter motor 12 comprising first and second battery cable assemblies 114 and 124. Battery cable assemblies 114 and 124 provide for connection of the battery terminals 16A-D and 18A-D to the battery cables 114 and 124, respectively, without intervening jumper cables. This is done by differentiating the opposite ends of battery cables 114 and 124. The end of battery cables 114 and 124 intended for connection to the vehicle electrical system/starter motor assembly 12 is a single stranded or braided conductor 131, 133, respectively. The opposite ends of battery cables 114 and 124, intended for connection to the battery terminals, are divided into a plurality of daughter cables corresponding to the number of batteries in the battery plant 50. For the four batteries 10A-D illustrated in FIG. 2 battery cable 114 has four daughter cables 114A-D, connected to positive post/stud terminals 16A-D. Battery cable 124 divides into four daughter cables 124A-D for connection to negative terminals 18A-D, respectively. Each daughter cable 12A-D may be terminated with a conventional connector (not shown) for attachment to a battery terminal.

The daughter cables of a particular battery cable include conductors of the same length, material and gauge. The material is usually copper. The electrical connections between each like polarity terminal and the vehicle electrical system should have nearly the same resistance. Where the batteries are disposed as shown in FIG. 2, arranged side by side, and the battery cables 114 and 124 are laid out to approach the resulting array at a midway point along the row of batteries, the daughter cables 114B and 114C connected to terminals 16B and C of the inner batteries and daughter cables 124B and C connected to terminals 18B and C are looped to adjust for the surplus length of these daughter cables relative to the daughter cables connected to the end batteries 10A and D. Using daughter cables of equal length and gauge provides consistent equalization of the resistance path from the batteries to the vehicle electrical bus for varying environmental conditions. The loop pattern adopted may vary to accommodate the direction from which the battery cable approaches a given battery plant, the arrangement of the battery terminals and the arrangement of the batteries. The arrangement assumes that the batteries exhibit the same internal resistance as one another. In a typical vehicle electrical system one battery cable is connected to the starter system and the second to the vehicle chassis or engine block as a ground.

Figure 4A:
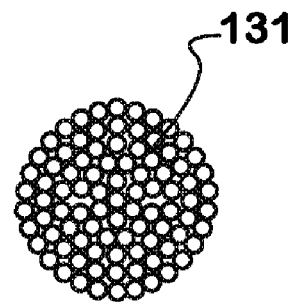
FIGS. 4A-B are cross sections of a stranded/braided battery cable.
Figure 4B:
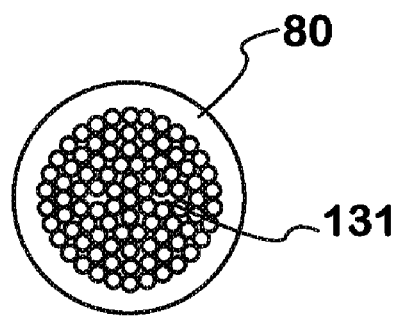
Figure 3:
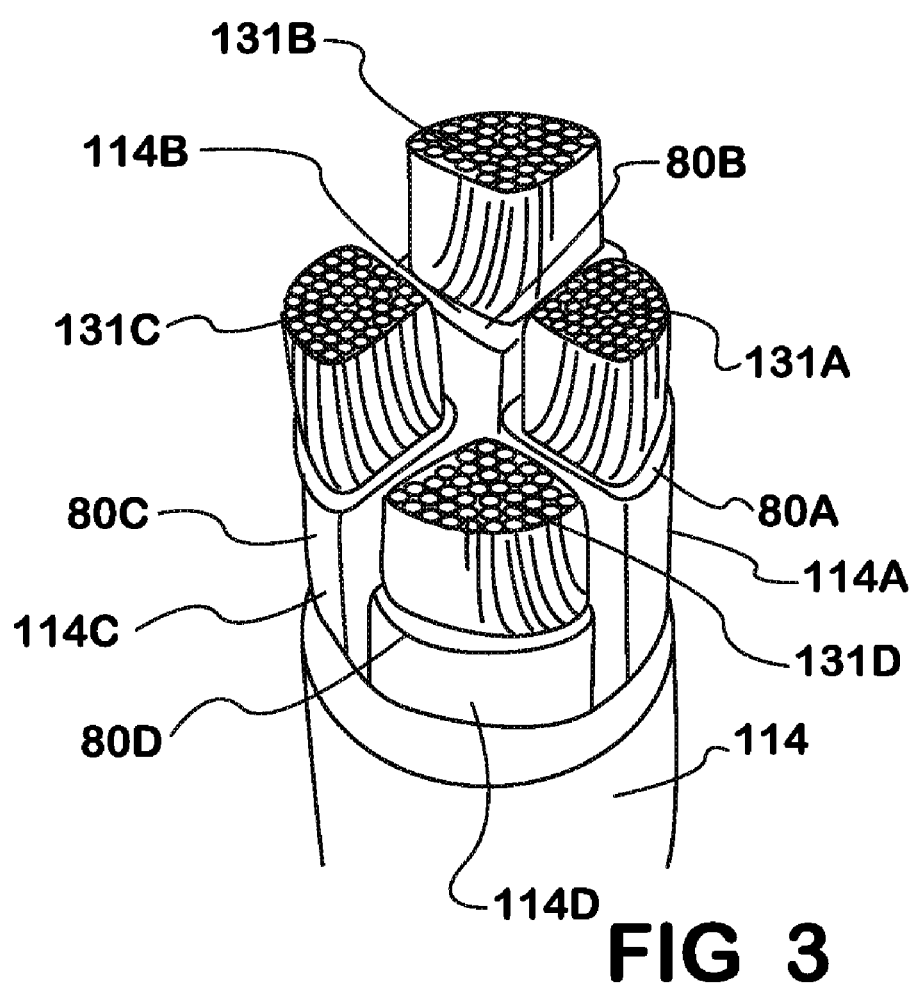
FIG. 3 is a cutaway view of a battery cable with four daughter cable assemblies.

Battery cables 114 and 124 may or may not be matched to one another. Where they differ, it will usually be in overall length. Thus, the construction of battery cable 124 may be directly inferred from reference to battery cable 114. Referring particularly to FIGS. 3 and 4A-B, battery cable 114 comprises three major sections viewed along its length and excluding terminal connectors: an exposed length of a single stranded conductor 131 including one end of the cable; an intermediate section where the single stranded conductor 131 is sheathed in an insulation layer 80; and a section of daughter cable assemblies 114A-D. Reference to conductor 131 as "stranded" or "braided" refers to a standard method of producing a flexible conductor in cable manufacture. Conductor 131 could also be "bunched", or, if a high degree of flexibility is not used, even a solid wire. However, a stranded conductor is more easily unbundled into four subsidiary conductors 131A-D for the four daughter cables 114A-D.

Each sub-conductor 131A-D includes one fourth of the wires/strands of conductor 131. Each sub-conductor 131A-D has the same gauge as the other sub-conductors and each carrier is sheathed in an insulation coat 80A-D moving away from the juncture of the sub-conductors to form the single conductor 80. The daughter cables 114A-D have the same length and, having conductors of the same gauge, are effectively electrically indistinguishable from each other. Batteries connected to a vehicle electrical system using battery cables 114, 124 are connected in parallel electrically. The character of the parallel connection is closer to an ideal parallel connection than is obtained using a combination of jumper cables and a battery cable since the resistance from each battery to the vehicle electrical system is much closer to being identical. The reduction in the proportional difference in resistance more evenly distributes the electrical load on each battery with the result that no battery should see a disproportionate degree of internal heating and heating around terminals is reduced by the reduction in the number of connections to each terminal to exactly one.

The claims are not limited to the foregoing detailed description, but are intended to extend to various changes and modifications thereof.

What is claimed is:

1. An electrical cable comprising:
   a first section having a main conductor sheathed in an insulation layer; and
   a subsidiary section formed at an end of the first section and depending from the first section, the subsidiary section including four subsidiary conductors, the subsidiary conductors being sheathed in insulation layers, one end of the four subsidiary conductors being electrically connected to the main conductor, and each of the four subsidiary conductors being physically configured to be of like resistance wherein the subsidiary conductors have like length and gauge.

2. An electrical cable as set forth in claim 1, comprising:
   a second end section depending from the first section comprising a length of unsheathed conductor.

3. An electrical power system comprising:
   a plurality of batteries each having terminals of first and second polarities;
   a first plurality of electrical conductors attached to terminals of the first polarity from the plurality of batteries; and
   the first plurality of conductors meeting at a juncture at ends distal to the terminals of the first polarity of the plurality of batteries to form a first joint conductor electrically connecting the plurality of batteries in parallel to electrical components of the electrical power system, the plurality of conductors having like length and gauge between the terminals of the first polarity and the juncture.

4. An electrical power system as set forth in claim 3, further comprising:
   a second plurality of electrical conductors attached to terminals of the second polarity from the plurality of batteries; and
   the second plurality of electrical conductors meeting at a juncture at ends distal to the terminals of the second polarity to form a second joint conductor, the second plurality of electrical conductors having like length and gauge between the terminals and the juncture.

5. An electrical power system as set forth in claim 4, further comprising:
   a vehicle starter motor connected to the first and second joint conductors.

6. An electrical power system comprising:
   a plurality of batteries;
   a load; and
   a connection system including conductors exhibiting closely matched resistance to one another connecting each of the plurality of batteries to the load in a parallel arrangement; wherein the connection system includes first and second battery cables, the battery cables including subsidiary cables extending along a portion of the length of the battery cables, the subsidiary cables having like length and gauge.

* * * * *